Patented July 1, 1930

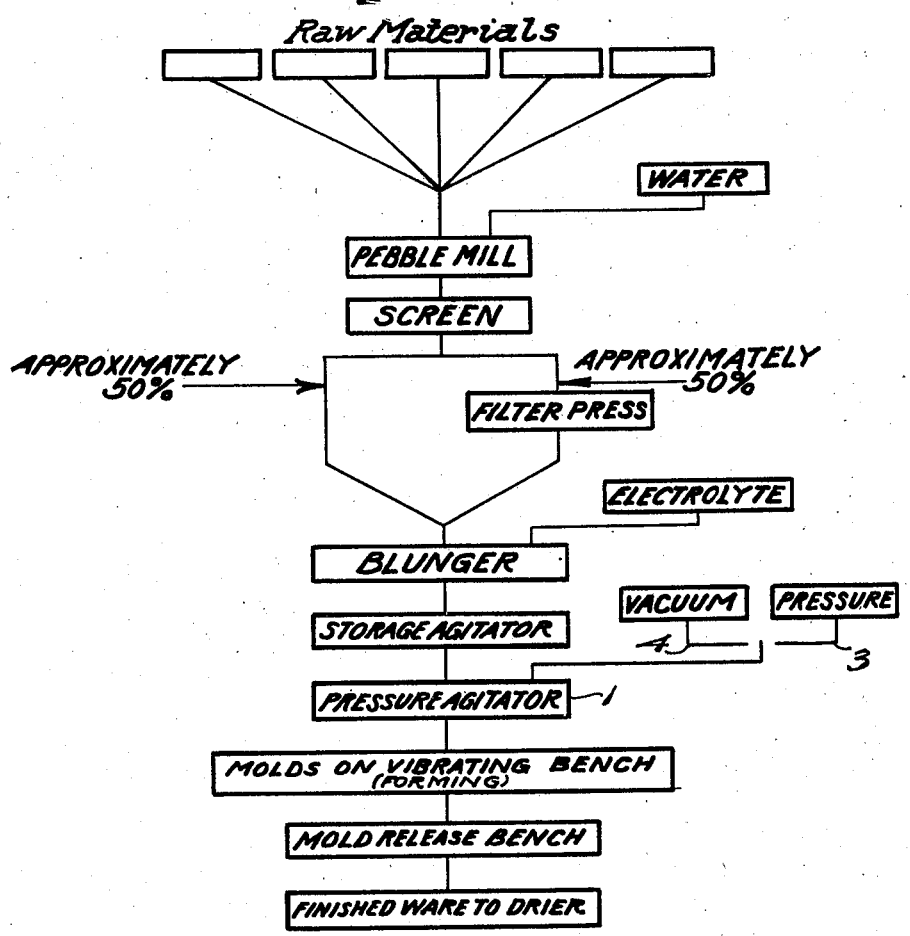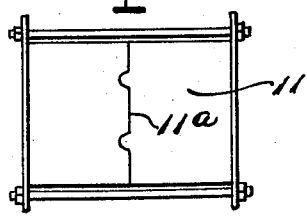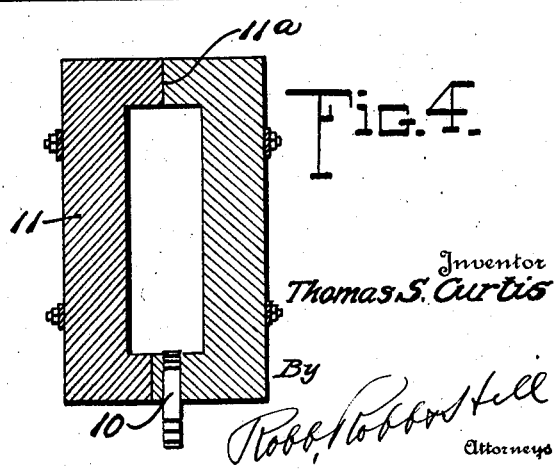

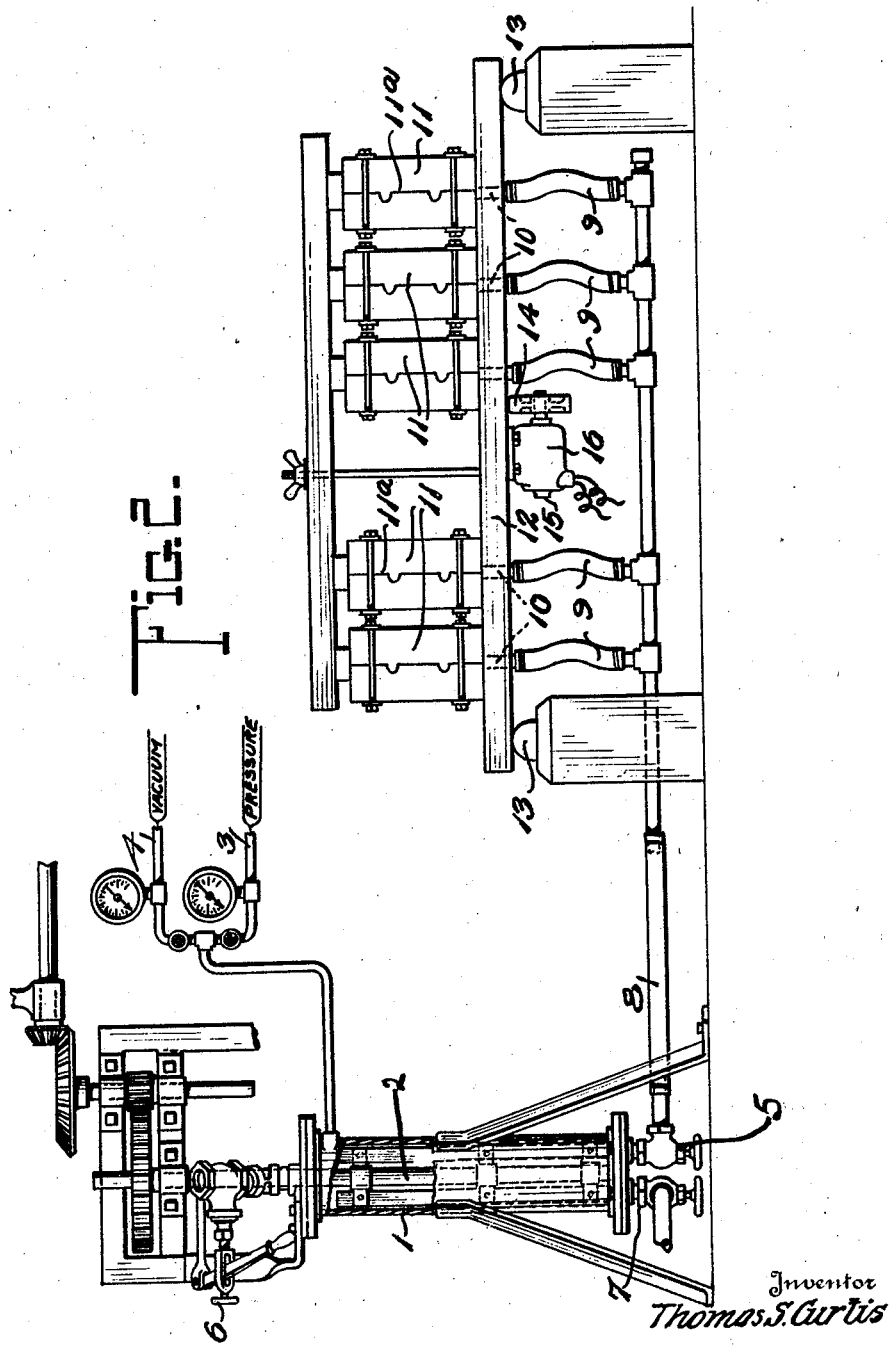

1,768,546

UNITED STATES PATENT OFFICE

THOMAS S. CURTIS, OF HUNTINGTON PARK, CALIFORNIA, ASSIGNOR, BY MESNE ASSIGNMENTS, TO VITREFRAX CORPORATION, OF LOS ANGELES, CALIFORNIA, A CORPORATION OF CALIFORNIA

PROCESS OF FORMING CERAMIC ARTICLES AND THE LIKE

Application filed November 16, 1926. Serial No. 148,708.

My invention embodies a novel process, and certain new apparatus by which it may be practised for forming ceramic shapes of substantially any kind known to the art, with important advantages as regards capability of making articles from non-plastic body compositions, control of the composition handled, homogeneity of the final product, cheapness of manufacture, saving of time and labor, high rate of mold turnover, and other desirable features never heretofore attained.

Since the said process and apparatus may have a larger field of application than to the ceramic art, I do not wish to limit myself to the latter in stating the scope of my invention and its possible utility.

By my invention hereinafter set forth, in practical effect, I have produced a new forming technique, which in the ceramic art alone, enormously cheapens and simplifies certain ceramic manufactures beyond the range of anything accomplishable by methods and apparatus known today, for the special reason that by this invention body compositions of totally non-plastic qualities may be easily and homogeneously molded or formed, something not before achieved to my knowledge; and those compositions where the plastic or clay content is present, but is negligible in proportion to the whole body of the mass, may be similarly handled but with even greater facility. The importance of the foregoing will be realized when I note that for certain kinds of ceramic manufactures absence of clay or plastic substances, in the composition from which they are made, is really necessary to obtain an article best serving certain particular purposes.

Notwitstanding the foregoing recognized condition, it has been practically impossible before this invention, to produce by any known methods or apparatus, perfect or commercially adequate ceramic articles of some types needed today, that are not defective in one way or another when the body composition lacks ingredients to make it plastic. I shall now attempt to bring out more in detail herein the reasons for the above statement.

For a full comprehension of my invention, I note that in the making of ceramic products of body compositions having high plasticity, and therefore readily workable, many processes have been developed to a relatively high degree by which to produce the articles of good quality and comparatively low cost. Where hard granular fused or calcined ingredients in large percentages are introduced into the body composition, the nature of the latter is so changed as to render very difficult molding or forming operations, this being due largely to the feeble plasticity of the body mixture that results to such an extent that it is sometimes almost impossible, if not impossible, to produce a homogeneous structure in the ultimate molded product.

Now, it is known that in the ceramic industry, the manufacture of articles of super-refractoriness and super-strength is of great importance and such articles require a very high percentage of non-plastic ingredients, and a minimum of bonding substance of the nature of clay. Indeed, in a number of cases, the presence of clay in any percentage is so detrimental that its use cannot be tolerated if the highest degrees of refractoriness and strength are to be attained. In such cases, the orthodox methods of molding and forming are so inadequate to cope with the feeble plasticity as to preclude the possibilities of their use without sacrificing a percentage of the value introduced by the non-plastic ingredients through the inclusion of physical defects such as folds, laminations, air pockets, air bubbles, seams and other mechanical imperfections.

Obviously, in plastic molding, the operator depends largely upon the flowing properties of the clay to obtain required homogeneity and compactness. This is true in respect to hand molding, as well as in respect to machine molding where the pressure of a ram is used. Where the body composition does not include sufficient clay or plastic substance to thoroughly lubricate the non-plastic material, the said body composition will not lend itself to the usual methods of forming referred to as it lacks sufficient plasticity to flow in all required directions. In fact, a non-plastic body composition becomes firm and unyielding on the application of pressure as distinguised from the action of the plastic composition.

The present invention deals with the conditions above outlined and involves the development of an entirely new method of forming what may be characterized as nonplastic compositions in such a way as to produce highly homogeneous structures in the ultimate formed article, structures in which mechanical flaws are substantially wholly absent. While, heretofore, it has been practically impossible to produce non-clay ceramic bodies of the class especially referred to above, by the process and apparatus of my invention hereafter described, super-refractory and super-strength articles of such class may be very readily made with a great saving in the handling of materials, turnover of the molds utilized, and superior integrity of the final article produced, and plastic ceramic compositions may be handled with even greater facility.

In order that the precise functioning of my improved method of forming may be understood, I shall call attention to two of the well-known and highly developed processes of ceramic molding now in use in the plastic composition field, since my improved process consists in a combination of the two methods with the introduction of a radical departure not common to either. In the so-called soft mud process, the body mixture is brought to the consistency of axle grease in which state it is susceptible to pressure of the fingers of the operator who may form the clay at will into various shapes usually within a plaster mold having the shape of the finished article. The second process, known as the casting process, involves the use of a clay body composition having sufficient water content to render it incapable of standing unsupported and incapable of being formed or molded by pressure of an operators fingers. In the casting process, as ordinarily employed, the mixture is rendered completely fluid through the addition of certain electrolytes which thoroughly destroy the cohesiveness of the clay particles and render what would be termed a rather thin mud so fluid that it may be poured into a plaster mold, filling the mold cavities by force of gravity. In the production of hollow-ware, such as cups, saucers, etc., when made by the casting process, it is common practice to allow the slip or fluid body composition to run into the mold until a sufficient thickness of de-watered cake has been built up on the interior of the mold, after which the mold is emptied of the remaining slip leaving the hollow casting adhering to the inside of the mold from which it may be removed on drying.

As previously indicated the soft plastic method of molding cannot be employed in the case of products containing high percentages of inert ingredients owing to lack of plasticity. This is to be deplored since the soft plastic method shows great advantages in safe drying, quick mold turnover and ease of handling of the green ware previous to firing. On the other hand, the ordinary method of casting with fluid slip while entirely satisfactory for hollow-ware having relatively thin wall sections is quite unsatisfactory for the production of relatively thick or massive pieces owing to the tendency for segregation of the nonplastic ingredients and to the tendency for zones of unequal density to form in the interior of the casting specimen as the water leaves the fluid body composition. This is readily understood and to be expected when one takes into account the vast difference in the rate of flow of the water through and from the mass as the solid cake builds up on the inside of the mold. Furthermore, in the ordinary method of slip casting in the case of massive pieces the portion of the casting next to the mold has actually started to shrink and to form a solid mass before the interior of the casting has reached a condition even approximating solidity. The result is an utter lack of homogeneity in the casting unless rare skill has been employed in the preparation of the slip and in the construction of the molds to relieve strains.

An additional objection to the slip casting process in the case of large and massive sections is the great length of time the ware must be permitted to remain in the mold in order that the water may be drained from the slip owing to the very large percentage of water necessary to produce sufficient fluidity for successful casting. It is not uncommon in the case of large castings for the product to remain in the mold twenty-four hours before the mold can be released. This involves a very great expense in mold maintenance as well as a large investment owing to the great number of molds necessary to secure mass production.

In my improved method of forming, I have eliminated (1) the tendency for mechanical flaws, strains and imperfections to form as the casting solidifies, and (2) have made it possible for relatively large and thick sections to be cast rapidly with a mold turn-over in some cases as frequently as every twenty minutes, thereby greatly reducing the investment in molds and facilitating mass production through a rapid mold turnover. At the same time the product coming from the molds is vastly superior in accuracy and homogeneity to that produced by the plastic mud process notwithstanding the fact that I am working with bodies of practically no plasticity.

The process of my invention may involve the use of a body composition, the ingredients of which are in a state of extremely fine sub-division, as for instance a batch designed to produce a high strength porcelain for electric insulators or similar products. Or the batch of the body composition may consist of a certain percentage of coarse granular crystalline fragments of any desired size, providing the sizing of the entire batch be such that the necessary small grains are proportioned in percentage to fill the interstices between the larger grains. In other words, if the body composition be finely ground it is essential to have the entire list of ingredients ground so thoroughly and intimately as to produce a mass of creamy consistency such as would be employed in the manufacture of a porcelain body of whatever composition. If the body is to be a coarse body such as is used in the manufacture of refractory articles then it is very desirable that the grains of material in the coarse body be properly proportioned in size to afford maximum density in the cast or formed shape.

I refer to the accompanying drawings, illustrating one mode of preparation of a body composition which may be used in the practise of my process, and certain apparatus employed for the purposes thereof, and in said drawings:—

Figure 1 is a flow sheet view illustrative of the steps of the forming process availed of in practising my method.

Figure 2 is a view in elevation showing my forming machine system including a typical pressure agitator and distributing system for the various molds illustrated, also the vibratable support and vibrating means for the molds and associated parts.

Figure 3 is a top plan view of one of the molds.

Figure 4 is a vertical sectional view of one of the molds.

Describing first the forming of a coarse grain body of the refractory type, I note that it is an essential phase of my method to manufacture properly sized ingredients for the body composition with the percentage of water necessary to wet comparatively every grain or particle of the mass so that it will have the consistency of jigger-mud, so known in the art. Such mud is just stiff enough to retain its shape when standing unsupported but may be deflected from this shape by slight jar or by slightest pressure brought to bear upon it. The percentage of water required to bring about this consistency varies according to the state of fineness of the body composition as a whole, the plasticity of the plastic portion of the body if it have such a portion and upon the general nature or character of the materials used.

The consistency of the body composition as that of jigger-mud being established, I add to the mud, an electrolyte such as will promote density of the composition or mass rather than its porosity. Sodium silicate may be the electrolyte and is preferred rather than a combination of sal soda and sodium silicate. The electrolyte will be added to the mud in a suitable mixing machine or blunger, until, after the mixing, the relatively stiff mud has become limp and no longer maintains its shape when unsupported. Usually a fraction of one percent of electrolyte will bring about the consistency referred to, and such consistency is maintained so long as the mixture is kept agitated, and will disappear when the agitation ceases. This control of the consistency is a prime characteristic of this step of the preparation of the body composition according to my process, it being quite essential that the percentage of water and electrolyte be such that the mass or body will assume a condition of arrested fluidity, or quasi-solidity within a few moments after agitation of the mixture ceases.

The phenomenon described as "arrested fluidity" is one that to the best of my knowledge is unknown in the art, and is highly important to my invention. In attempting to make castings of non-plastic bodies, previously referred to, I ascertained that common casting methods produced a large number of faulty pieces or casts. The flaws usually were located in the central portion or core of the article made. Investigation disclosed that a bar or casting of such non-plastic body, apparently solid or firm when removed from a mold, became limp or semi-fluid if manipulated after such removal. In fact manipulation of a bar or casting was found to actually cause its melting from the apparently solid mass so that it would drip. Further investigation revealed to me in relation to body compositions varying from those free from clay substance to those having as much as forty (40%) percent of clay substance that vibration or jarring would disturb the apparent solidity to the extent of causing the melting of the casting without changing temperature. In other words, the vibration or jar would produce the same effect as manipulation, namely, cause the apparently solid mass to become semi-fluid. The process of my present invention involves the making use of the above discovery. The tendency toward solidification of the body composition, I think, is probably due to the cohesion of the particles of suspended matter in a fluid rich in particles so fine as to be almost colloidal, though this may not be an accurate deduction.

Referring now to the preparation of a batch of body composition, when the latter is a typical fine body such as usual for manufacturing porcelain or other vitreous ware, I prefer to mix and grind by the common ball or pebble mill process, using sufficient water to secure efficient grinding and delivery from the mill. I then filter press a portion of this slip to remove the excess water. The balance of the slip from the mill is then charged into a blunger or other suitable mixing machine, and to this slip of low viscosity is added the filter cake of the same composition until the specific gravity of the batch has been brought up to above thirty ounces to the pint. The exact specific gravity will depend upon the body composition, but in general will be well above the gravity of ordinary casting slip which will vary from twenty-six ounces to possibly thirty ounces to the pint. The thickened slip will have assumed the consistency of jigger-mud, as previously described, by this time. As the electrolyte is added, the viscosity gradually lowers until the mud will no longer support its own weight so long as the agitator revolves. But once agitation has stopped, the heavy liquid starts almost immediately to solidify and if permitted to stand without agitation for more than a few minutes, it becomes so viscous as to permit cutting with a knife. The slightest movement in the mass, however, causes it to return to the liquid state.

From the foregoing, it will be noted that the body composition must be kept in motion while in storage in order to maintain it in condition for forming. I have discovered, however, that vibration of the solidified mass will again bring it to a state of fluidity so long as the water content is preserved at the proper point and if reasonable precautions are taken to prevent evaporation. This precaution is best taken by having the body composition in a closed top agitator or mixer which prevents the escape of very much moisture laden air.

Obviously such a mass having a viscosity so high that it will not flow by gravity into the cavities of a mold cannot be molded by any ordinary process of forming. Having discovered, however, that vibration maintains the mass in a state of fluidity for practically indefinite periods of time, I apply this discovery to the process of molding in the following way.

I now refer to the accompanying drawings and especially to Figure 1 which constitutes practically a flow sheet of my forming process and I will describe the complete method of preparing my materials in conjunction with the flow sheet, Figure 1, and a typical apparatus such as may be used for practising my invention such as illustrated in Figures 2, 3, 4 and 5 of the drawings.

First referring to Figure 1, the raw materials are weighed in the usual way into a batch of the proper size to charge the pebble mill. Water is added to bring the batch to the consistency of thin cream, in order that the entire contents of pebble mill may readily be passed through the screen, which retains and discards any fragments of mill lining or pebbles, together with any imperfectly ground residue from the batch itself.

At this point, it is well to call attention to the fact that the pebble mill process of body preparation is the preferred one, since it represents modern practice and admittedly gives the best control of body structure. The older process of blunging the raw batch may be substituted for the pebble mill without departing from the spirit of the invention, however, since my process is operative with any process of body preparation that gives satisfactory results with the ordinary casting process.

The prepared body coming from the screen is shown in the flow sheet as dividing into two approximately equal volumes, one half of the flow passing through filter presses which remove the excess of water and deliver the body as filter cake. The other half of the slip passes directly to a blunger, into which is charged also the filter cake from the presses. It is necessary to point out that this division of the volume of the slip is suggestive only, the actual division or proportion of filter cake to slip being governed by the percentage of non-plastic ingredients in the body and the percentage of water in the slip. The object of filter pressing a portion of the slip is merely to afford a means of thickening the slip to the consistency of jigger-mud in the blunger, and any other means of thickening may be employed at this point without departing from the spirit of the invention.

At the blunger, the control of viscosity and specific gravity of the slip is effected. Whereas in ordinary casting processes, the gravity of the slip will usually be from twenty-seven to thirty ounces in weight to the pint, the gravity of my slip will be from thirty ounces upward depending upon the percentage of solid, non-plastic ingredients in the body composition, and the specific gravity of said solid ingredients. The viscosity of the ordinary casting slip is so low as to permit the liquid readily to run by gravity into the cavities of a plaster mold, whereas in my process, the viscosity is so high that the slip solidifies within a few minutes after agitation has ceased so that it cannot be poured. The control at the blunger is readily maintained through visual examination once the operator has gained experience, since the process offers wide degrees of flexibility. The desired viscosity is that at which the knives of the blunger will move through the agitated liquid without causing the latter to pile up. This viscosity is easily controlled through the addition of more electrolyte, if stiffness is indicated; more filter cake, if the gravity is too low or if the mass refuses to solidify when a sample is taken out and permitted to stand without agitation; and more slip, if the viscosity and gravity have been increased so much as to cause piling up around the plunger knives. All of these adjustments may be made without varying the chemical or ceramic composition of the slip as will readily be appreciated.

Having manufactured the body under conditions of exacting control at the blunger, wherein it may remain until all physical tests have been completed to check the condition, and to correct the latter if it is faulty, the entire charge from the blunger may be transferred to the storage agitator which consists of a large storage tank of any desired capacity, preferably large enough to hold an entire day's supply of slip to guard against breakdown of the preparation machinery. The heavy slip may be stored indefinitely in a covered storage tank, providing it is kept in motion by means of a slowly moving agitator which, should, however, serve the entire interior of the tank, fitting to within a short distance of the tank wall.

From the storage agitator so designated in the flow sheet illustration Figure 1, the slip is drawn as needed into pressure agitators which form the first unit of the forming machine system employed in my invention. Figure 2 illustrates a typical pressure agitator which comprises a steel tank 1. An agitator shaft 2 passes through a suitable packing gland bearing at the upper end of the tank, made air tight against one-hundred pounds pressure. Graphite gland packing has been found to be self lubricating and satisfactory to maintain the pressure. The shaft 2 is rotated at a speed of approximately eight revolutions per minute, by any suitable driving means, the details of which are unimportant herein, and said shaft working the agitating means carried thereby within the tank 1 keeps the slip in fluid condition without stirring air into the mass. The agitator blades are fitted close to the steel container so that every available ounce of the slip is kept agitated.

The tank is served by an air pressure line (3) and a vacuum line (4) with valves so disposed as to permit the vacuum to be shut off and pressure admitted, or vice versa, at will. Vacuum and pressure gauges indicate the respective values.

At the bottom of the tank is a large valve (5) which delivers the slip to a rubber hose. At the top of the tank is a large, quick-opening valve (6) to release either vacuum or pressure.

The operation of the system is as follows: The correctly made slip is introduced into the pressure agitator tank from the storage agitator by means of an interconnected valve (7) and pipe line connected with the bottom of the pressure agitator tank. Vacuum is established in the latter in order that the slip may be drawn into the tank from the bottom upward to avoid the introduction of air bubbles in the operation. When the tank is nearly full, as determined by simple flow control meters, the valve is closed and vacuum is run up to twenty-five inches. As the agitator slowly revolves, the vacuum draws out any occluded air bubbles leaving the slip in a very uniform and extremely dense physical condition. Usually fifteen minutes is sufficient to complete the vacuum treatment.

At the close the vacuum treatment, the large valve (6) at the top of the tank is opened, the agitator having been momentarily stopped while the air rushes in. The large valve is then closed and pressure is introduced, after starting the agitator.

The rubber hose (8) at the bottom of the tank leads to the inlet nozzles of the molds (11) through convenient gang connections (9) made up with standard pipe fittings. The nozzles are of standard galvanized iron pipe nipples (10) cast into the plaster mold at the bottom. There is no outlet for the air at the top of the mold other than the leakage through the joint (11$^a$) where the two halves of the mold come together. This is purposely done since it is desired to have the heavy slip rise in the molds under some back-pressure which tends to prevent surges of the slip.

In filling the molds, it is desirable to merely "crack" the valve so that the slip flows upward from the bottom of the mold in a steady but slowly rising stream.

Prior to filling the molds, the bench (12) on which the molds rest, must be set into vibration. A convenient means for accomplishing this is illustrated in the drawing which shows a diagrammatic view of the vibrating bench with its molds. The vibration is conveniently imparted by means of an unbalanced pulley (14) on a rapidly rotating shaft (15) driven by a motor (16). The bench rests on rubber cushions (13) at the corners in order that vibration may be made effective over the entire surface. It is well to have considerable weight in the bench in order that a positive and uniform vibration may be given to the molds clamped to its surface, the hose (8) at the same time being vibrated.

The pressure to be used depends upon the composition of the slip and upon the shape and size of the castings to be made. As an example, cylinders 2½ inches in diameter by 10 inches in length require twenty pounds pressure for twenty minutes to acquire solidity when cast from a typical, non-plastic slip of ninety percent solids and ten percent clay, the whole being ground to pass a 200 mesh screen. The same body, if free cast by the ordinary method using slip of low viscosity, requires seven hours to reach solidity in the same size of mold.

Larger pieces, and bodies having greater clay content, require higher pressures if the casting or forming time is to be made short. Plaster molds of quite ordinary construction have been successfully used with pressures up to fifty pounds at which pressure the forming time is cut down to a minimum. Thin section ware has been cast or formed in three minutes with this system, the ware being in gang molds.

The high specific gravity of the slip used in my forming process is made possible through the use of the minimum amount of water needed to produce fluidity under vibration. As a result of this small amount of water, the mold is filled almost at once with solid matter, the water pore space being at a minimum. The pressure head against the slip causes the small amount of excess water to leave the mass within the mold very rapidly while vibration keeps the mass fluid up to the very moment that the water content has gone down to the point where the particles are no longer lubricated and solidity results.

As a result of these combined effects, the time required for mold release is relatively short. As a rule, the mold may be opened as soon as pressure is released and vibration has stopped. There is far less tendency for the casting to stick to the mold than is the case with free cast ware. The viscosity of the slip is so high that there is not the same tendency for infinitely fine particles of slip to penetrate the pores of the mold causing the casting to freeze on to the mold, as is the case with free casting especially if the slip is not properly conditioned.

It is desirable to remove the ware from the molds as soon as possible after pressure is released, since drying in air produces a far better structure with less tendency for strains than is the case if the casting is permitted to remain for a long time in the molds. There is of course the additional incentive to get the molds back into service.

While the foregoing has been essentially a description of the process of forming a coarse grained body virtually the same method is employed in the case of a finely ground body of the porcelain class. The only difference lies in the time required for the production of a solid casting which may, of course, be several times as great as that required for the casting of the coarse grained body owing to the greater percentage of water in the body composition. As an illustration, however, of the effectiveness of my improved process I may state that in the casting of cylinders 2½ inches in diameter by 10 inches long with a body consisting of 95% inert or non-plastic ingredients and five percent plastic clay the entire mass being ground in a pebble mill to pass a two hundred mesh standard screen, I am able to maintain a mold turnover of thirty minutes whereas with free casting of the same body by the ordinary methods the ware must remain in the mold twenty-two hours before it can safely be released. This rather remarkable facilitation of forming is accompanied by a marked increase in the quality of the article, there being no noticeable flaws or imperfections in the cylinder cast by my improved process whereas nine out of ten cylinders cast by the ordinary method of the same body have been found to have flaws, knots and other imperfections in the core, which experience is common in the casting of extremely fine bodies in large cross sections.

By my process, it is possible to use a body so devoid of plasticity that it cannot be jiggered or pressed, and to secure a rate of mold turnover practically as rapid as with jiggering or pressing, and at the same time eliminate altogether the problem of highly skilled labor, with the assurance that the formed ware will be the equal of, if not superior, to the best pressed or jiggered ware in physical structure and uniformity.

Furthermore, my process obviates the necessity for aging the body, since it does not depend upon plasticity or working qualities for the perfection of the molded or formed piece.

Still more important is the fact that there is no necessity for a pound of the body to be handled by hand, except at the filter presses, in the operation up to the point where the product emerges from the mold. The entire mass is readily handled by pipe line conveyance right up to the mold. If clogging occurs anywhere along the line due to enforced standing, tapping of the pipe line by means of a portable air or electric vibrator immediately turns the solidified mass into fluid which may be moved readily by pressure on the system.

The physical conditioning of the slip is under perfect control at the blunger, without need to vary its ceramic formula in the operation. The storage of the heavy slip may be in any desired quantity with the certainty that it will keep indefinitely in that condition.

The problem of cuttings and crops and other waste or scrap is reduced to a minimum, since the only crop is the small plug of solidified slip that forms in the nozzle of the mold. This is readily recovered and added to the batch at the blunger since it is clean and free from bits of plaster such as will frequently be found in the scrap of jigger-mud.

Lastly, it is believed that any shape that can be made by any other forming process known to the ceramic industry, can be formed by my process with the important advantages above noted.

Having thus described my invention, what I claim as new and desire to secure by Letters Patent of the United States, is:—

1. The process of forming ceramic articles which comprises agitating an admixture of finely divided refractory material and a liquid to produce a turbulence of the admixture and introducing the same into a forming device and maintaining the material therein in a turbulent condition.

2. The method of forming ceramic articles, or the like, which consists in producing a body composition having the characteristic of solidifying when not agitated and attaining fluidity when agitated, operating thereon to cause it to become fluid, and introducing the composition into a mold while maintained in substantially its fluid condition, and maintaining the fluid condition by agitating the composition and without temperature changing.

3. The method of forming ceramic articles, or the like, which consists in producing a body composition having the characteristic of solidifying when not agitated and attaining fluidity when agitated, operating thereon to cause it to become fluid, and introducing the composition into a mold under pressure while maintained in substantially its fluid condition by agitating the composition during the introduction into the mold.

4. The method of forming ceramic articles, or the like, which consists in producing a body composition having the characteristic of solidifying when not agitated and attaining fluidity when agitated, operating thereon to cause it to become fluid, and forming the composition into a selected shape while in substantially the last specified condition maintained by agitation.

5. The new method of forming ceramic articles, or the like, which consists of preparing a ceramic body composition that possesses the characteristic of solidifying while in a state of rest, and becoming fluid when subjected to movement, and forming the same into a shape without temperature change while agitated in which condition it is in a state of fluidity and most suited to be shaped.

6. The new method of forming ceramic articles, or the like, which consists of preparing a ceramic body composition of such a nature that it melts or flows when agitated, and assumes a condition of arrested fluidity when in a state of quiescence, agitating the same to cause it to become fluid and forming the same into a required shape while fluid and maintaining the condition of fluidity by agitation of the composition.

7. The new method of forming ceramic articles, or the like, which consists of preparing a ceramic body composition that possesses the characteristic of solidifying while in a state of rest, and becoming fluid when subjected to agitation, and applying pressure to the composition while in agitation to flow it into a shaping means while under continued agitation.

8. The new method of forming ceramic articles, or the like, which consists of preparing a ceramic body composition that possesses the characteristic of solidifying while in a state of rest, and becoming fluid when subjected to movement, applying pressure to the composition while in agitation to flow it to a shaping means, and maintaining it in agitation while acted on by the shaping means.

9. The new method of forming ceramic articles, or the like, which consists of preparing a ceramic body composition that possesses the characteristic of solidifying while in a state of rest, and becoming fluid when subjected to movement, applying pressure to the composition while in agitation to flow it to a shaping means, and subjecting the shaping means to movement while the composition is flowed thereto so that the latter may not solidify until completely shaped by the shaping means.

10. The new method of forming ceramic articles, or the like, which consists of preparing a ceramic body composition of such a nature that it melts or flows when agitated, and assumes a condition of arrested fluidity when in a state of quiescence, agitating the same to cause it to become fluid and forming the same into a required shape while fluid, and maintaining the composition in agitation while acted on by the forming means.

11. The new method of forming ceramic articles, or the like, which consists of preparing a ceramic body composition of such a nature that it melts or flows when agitated, and assumes a condition of arrested fluidity when in a state of quiescence, agitating the same to cause it to become fluid and continuing such agitation while forming the same into a required shape while fluid, and discontinuing its agitation after forming to permit it to harden quickly for prompt removal from the zone of action of the forming means.

12. The new method of forming ceramic articles, or the like, which consists of preparing a ceramic body composition that possesses the characteristic of solidifying while in a state of rest, and becoming fluid when subjected to movement, applying pressure to the composition while in agitation to flow it to a shaping means, and maintaining it in agitation while acted on by the shaping means, discontinuing the agitation of the same so that when shaped the shaped body may solidify, and thereafter discontinuing the action of the shaping means thereon.

13. The new method of forming ceramic articles, or the like, which consists of preparing a ceramic body composition of such a nature that it melts or flows when agitated, and assumes a condition of arrested fluidity when in a state of quiescence, agitating the same to cause fluidity thereof, distributing the composition to a mold while under maintained agitation, and permitting solidification in such molds.

14. The new method of forming ceramic articles, or the like, which consists of preparing a ceramic body composition of such a nature that it melts or flows when agitated, and assumes a condition of arrested fluidity when in a state of quiescence, agitating the same to cause fluidity thereof, distributing the composition to a mold while under maintained agitation, and discontinuing the agitation to arrest fluidity and establish a predetermined shaped condition.

15. The new method of forming ceramic articles, or the like, which consists of preparing a ceramic body composition of such a nature that it melts or flows when agitated, and assumes a condition of arrested fluidity when in a state of quiescence, agitating the same to cause fluidity thereof, distributing the composition to a mold while in such state, and subjecting the molds to agitation while the composition is entering them so as to maintain fluidity of the composition during preliminary molding, and thereafter discontinuing said mold agitation to permit the solidification of the composition in the mold and prompt forming and withdrawal therefrom.

16. The new method of forming ceramic articles, or the like, which consists of preparing a ceramic body composition of such a nature that it melts or flows when agitated, and assumes a condition of arrested fluidity when in a state of quiescence, agitating the same to cause fluidity thereof, distributing the composition to a mold while in such state, and subjecting the molds and distributing means to agitation while the composition is entering them so as to maintain fluidity of the composition during preliminary molding, and thereafter discontinuing said mold agitation to permit the solidification of the composition in the mold and prompt forming and withdrawal therefrom.

17. The new method of forming ceramic articles, or the like, comprising the preparation of a nonplastic body composition of the refractory type with water to create the consistency of jigger-mud so known, mixing therewith an electrolyte to densify the body and establish fluidity of a nature that will continue so long as the body is agitated, and become arrested when the agitation ceases at which time the body will become quasi-solidified, and molding the body to a predetermined shape while in its state of fluidity maintained by agitation.

18. The new method of forming ceramic articles, or the like, comprising the preparation of a non-plastic body composition of the refractory type with water to create the consistency of jigger-mud so known, mixing therewith an electrolyte to densify the body and establish fluidity of a nature that will continue so long as the body is agitated, and become arrested when the agitation ceases at which time the body will become quasi-solidified, maintaining the body in a container preventing loss of its moisture content, agitating the body in the container when fluidity of the body is desired and conveying the body to a desired point of use when in such last mentioned condition which has been maintained by continued agitation of the body.

19. The new method of preparing ceramic articles, or the like, comprising the preparation of a nonplastic body composition of the refractory type with water to create the consistency of jigger-mud so known, mixing therewith an electrolyte to densify the body and establish fluidity of a nature that will continue so long as the body is agitated, and become arrested when the agitation ceases at which time the body will become quasi-solidified maintaining the body in a container when fluidity of the body is desired and conveying the body to a desired point of use when in such last mentioned condition, and agitating the conveying means when the conveying operation takes place.

20. The process of preparing ceramic compositions, comprising mixing and grinding a body composition with water to provide a slip, filter pressing a portion of the slip, remixing the remainder of the slip and the filter cake, agitating them together to obtain the consistency of "jigger mud" so known, and then adding an electrolyte to lower the viscosity of the mass and create a body composition which will solidify when at rest, and become fluid when agitated.

21. That new method of making a body composition for ceramic articles, or the like, which consists in mixing the necessary ingredients to supply a slip from which the articles are to be formed, and controlling the viscosity of the slip to bring a batch thereof to be used up to a specific gravity well above thirty ounces per pint, and adding to such slip an electrolyte to lower its viscosity and create a condition of the slip such that it will solidify while at rest but become fluid when agitated and agitating the slip during forming operations.

22. In the art of ceramic manufacture, the process which consists of subjecting a casting slip to the action of a vacuum for withdrawing all air from the body composition of the slip, and then forcing the slip into a porous mold under air pressure and maintaining said pressure a predetermined time preliminary to removal of the slip from the mold in the form of a finished article, and subjecting the mold to vibration as the slip is forced thereinto.

23. In the art of ceramic manufacture, the process which consists of subjecting a slip of a body composition such that it will solidify when at rest, and become fluid when motion is imparted thereto, to the action of a vacuum while in a state of agitation, whereby to withdraw the air from the body composition, and thereafter causing air pressure to act upon the body composition to convey the same to a place of forming, and maintaining said composition in bodily motion independent of its conveying movement.

24. In the art of ceramic manufacture, the process which consists of subjecting a slip of a body composition such that it will solidify when at rest, and become fluid when motion is imparted thereto, to the action of a vacuum while in a state of agitation, whereby to withdraw the air from the body composition, and thereafter causing air pressure to act upon the body composition to convey the same to a place of forming, and maintaining said composition in bodily motion independent of its conveying movement, then causing the composition to enter a porous mold while under pressure of its conveying movement, and subjecting the mold to vibration as the slip is caused to enter the same.

25. In the art of ceramic manufacture, the process which consists of causing a casting slip possessing the characteristic of solidifying when at rest and becoming fluid when vibrated, to be contained in a closed receptacle, subjecting the slip while in said closed receptacle to a vacuum sufficient to withdraw practically all the air from the body composition of the slip, then relieving the vacuum and subjecting the slip to the action of air pressure to cause it to be conveyed to a point of use, and vibrating the slip bodily independently of its conveying movement during its conveying operation, and also subjecting the slip to vibration after it has reached the point of its use to facilitate its formation into a shape.

26. In the art of ceramic manufacture, the subjecting of a casting slip comprising a body composition adapted to solidify when at rest and become fluid when vibrated, to the action of air pressure for moving the slip into a porous mold, and causing the entrance of the slip into said mold at the bottom of the latter so as to fill the mold from the bottom and allow free escape of air in advance of the entering slip and agitate the slip during the entering step.

27. The process of forming ceramic articles which comprises agitating an admixture of finely divided refractory material and a liquid to produce a turbulence of the admixture, and dehydrating and forming the article without intervening lapse of turbulent action.

28. The process of forming ceramic articles, which comprises admixing finely divided refractory material and liquid to form a homogeneous pasty consistency and forming the article while maintaining the solids in motion and without change in temperature.

29. The process of forming ceramic articles, which comprises admixing finely divided refractory material and liquid in a mixing receptacle to produce a turbulence of the admixture, transferring said admixture to a shaping vessel and maintaining the turbulence of the material during the transfer.

In testimony whereof I affix my signature.
THOMAS S. CURTIS.